United States Patent
Prichard (10) Patent No.: US 10,094,647 B2
(45) Date of Patent: Oct. 9, 2018

(54) TOOL WITH MULTIPLE MEASUREMENT MARKINGS

(71) Applicant: Maddox Prichard, Gallatin, TN (US)

(72) Inventor: Maddox Prichard, Gallatin, TN (US)

( * ) Notice: Subject to any disclaimer, the term of this patent is extended or adjusted under 35 U.S.C. 154(b) by 0 days.

(21) Appl. No.: 15/645,978

(22) Filed: Jul. 10, 2017

(65) Prior Publication Data

US 2018/0010899 A1 Jan. 11, 2018

Related U.S. Application Data (60) Provisional application No. 62/360,883, filed on Jul. 11, 2016.

(51) Int. Cl.
| | |
|---|---|
| *G01B 5/18* | (2006.01) |
| *G01B 3/04* | (2006.01) |
| *G01B 5/02* | (2006.01) |
| *A01B 1/02* | (2006.01) |

(52) U.S. Cl.
CPC .................. *G01B 5/18* (2013.01); *A01B 1/02* (2013.01); *G01B 3/04* (2013.01); *G01B 5/02* (2013.01)

(58) Field of Classification Search
CPC .. A01B 1/02; A01B 1/08; A01B 76/00; G01B 5/18; G01B 5/02; G01B 3/04
See application file for complete search history.

(56) References Cited

U.S. PATENT DOCUMENTS

| | | | | |
|---|---|---|---|---|
| 1,299,417 | A * | 4/1919 | Bailey | A01B 1/20 172/375 |
| 1,983,815 | A * | 12/1934 | Schmiett | A01C 5/02 283/115 |
| 6,089,632 | A * | 7/2000 | Pickren | E21B 11/005 294/118 |
| 6,105,293 | A * | 8/2000 | Eason | G09F 3/04 40/645 |
| 6,238,907 | B1 * | 5/2001 | Schuler-Maloney | A61B 10/0096 206/459.5 |
| 6,769,302 | B1 * | 8/2004 | King | G01F 19/00 73/426 |
| 9,699,946 | B2 * | 7/2017 | Bellah | A01B 1/02 |
| 2005/0093316 | A1 * | 5/2005 | O'Rear | B25G 1/12 294/57 |
| 2008/0054659 | A1 * | 3/2008 | Boxum | A01B 1/02 294/51 |

(Continued)

*Primary Examiner* — Stephen A Vu
(74) *Attorney, Agent, or Firm* — Wayne Edward Ramage; Baker Donelson (57) ABSTRACT

A tool with multiple measurement markings for use in assessing the depth and width of a hole or crevasse while gardening, landscaping, or performing other forms of excavation. The tool may also be used to measure distances on the ground or the height of various objects. The tool includes a handle with a tool attachment, such as a shovel or hoe blade, affixed to the proximal end of the handle. The tool has multiple lines of measurement markings across the front or back of the handle and attachment. These lines may start at the tip of the attachment and continue sequentially to the distal end of the handle. There may also be an additional line of measurement markings on the back of the handle with a starting point at the distal end of the handle. The attachment itself also may be marked with one or more lines of measurement markings on the front or back of the attachment.

10 Claims, 11 Drawing Sheets

(56) References Cited

U.S. PATENT DOCUMENTS

2015/0319908 A1* 11/2015 Kuss .................. A01B 1/06
172/371

* cited by examiner

TOOL WITH MULTIPLE MEASUREMENT MARKINGS

This application claims benefit of and priority to U.S. Provisional Application No. 62/360,883, filed Jul. 11, 2016, by Maddox Prichard, and is entitled to that filing date for priority. The specification, figures, and complete disclosure of U.S. Provisional Application No. 62/360,883 are incorporated herein in their entireties by specific reference for all purposes.

FIELD OF INVENTION

This invention relates to a tool or gardening instrument with multiple measurement markings.

SUMMARY OF INVENTION

In various embodiments, the present invention comprises a tool or gardening instrument that, in addition to normal use for said instrument, may also be used in assessing the depth and width of a hole, ditch, excavated area, or crevasse while gardening, landscaping, or performing other forms of excavation. The tool or gardening instrument comprises a handle and tool attachment with multiple lines of measurements markings on the handle, tool attachment, or both.

As disclosed herein, the term "tool attachment" refers to any tool or implement that is suitable for construction or gardening, including, but not limited to, a shovel or a hoe. The plurality of measurement markings may also be provided on other tools, implements, or gardening attachments, including, but not limited to, shovels, hoes, rakes, trowels, aerators, pitchforks, spades, edgers, weeders, snow shovels, and the like.

In several embodiments the invention comprises two lines of measurement markings on the handle (with some extension across the tool attachment, as appropriate): one on the front face and one on the back face. One set of markings (e.g., the front) start from the tip of the tool attachment, extend across the face of the attachment and increase towards the distal end of the handle (i.e., "bottom-start"). This permits the user to easily measure the depth of a hole while digging by simply resting the tip of the gardening attachment in the bottom of the hole and viewing the top of the hole against the measurement line. The second set of markings (e.g., the back) start from the distal end of the handle and increase towards the gardening attachment (i.e., "top-start"). This permits the user to easily measure distances on the ground (such as the distance between plantings or holes, width of the top of the hole, and the like) by placing the gardening instrument on the ground with the distal end of the handle as the starting point. The distal end of the gardening attachment also may be placed on the ground and the gardening instrument held vertically to measure the height of various objects from the ground (e.g., fence rail, fence post). In an alternative embodiment, the bottom-start and top-start measurement lines may be reversed as to the face of the handle.

Three, four, or more measurement lines may be provided on the handle (e.g., front, back, right side, left side), and the markings may use different standards. Each measurement line may be independent, or may share a marking that circles or circumscribes the handle. The markings may be printed or painted on the handle, or may be engraved, inscribed, impressed or carved therein, or combinations thereof (with or without printing or coloration). In several embodiments, the markings may be printed on a covering, wrap, or strip (which may be opaque, or transparent in whole or in part) that may be affixed to the handle or other parts of the tool. The covering, wrap or strip may be comprised of any suitable material, and may be self-adhering with a removable backing cover. Multiple coverings, wraps or strips may be used on the same tool.

In several embodiments the present invention also comprises one or more lines of measurement markings on at least one face of the tool attachment. The markings may be printed, painted, engraved, inscribed, impressed thereon, or combinations thereof (with or without printing or coloration). The measurement lines may be on the front face or back face of the tool attachment, or both. The measurement lines may be located centrally on the face of front/back, along the edges, or combinations thereof.

DETAILED DESCRIPTION OF EXEMPLARY EMBODIMENTS

In various exemplary embodiments, the present invention comprises a tool or gardening instrument for use in assessing the depth and width of a hole, ditch, excavated area, or crevasse while gardening, landscaping, or performing other forms of excavation. The tool or gardening instrument 2 comprises a handle 4 and tool attachment 6 with multiple lines of measurements markings on the handle, tool attachment, or both.

Figure 1:
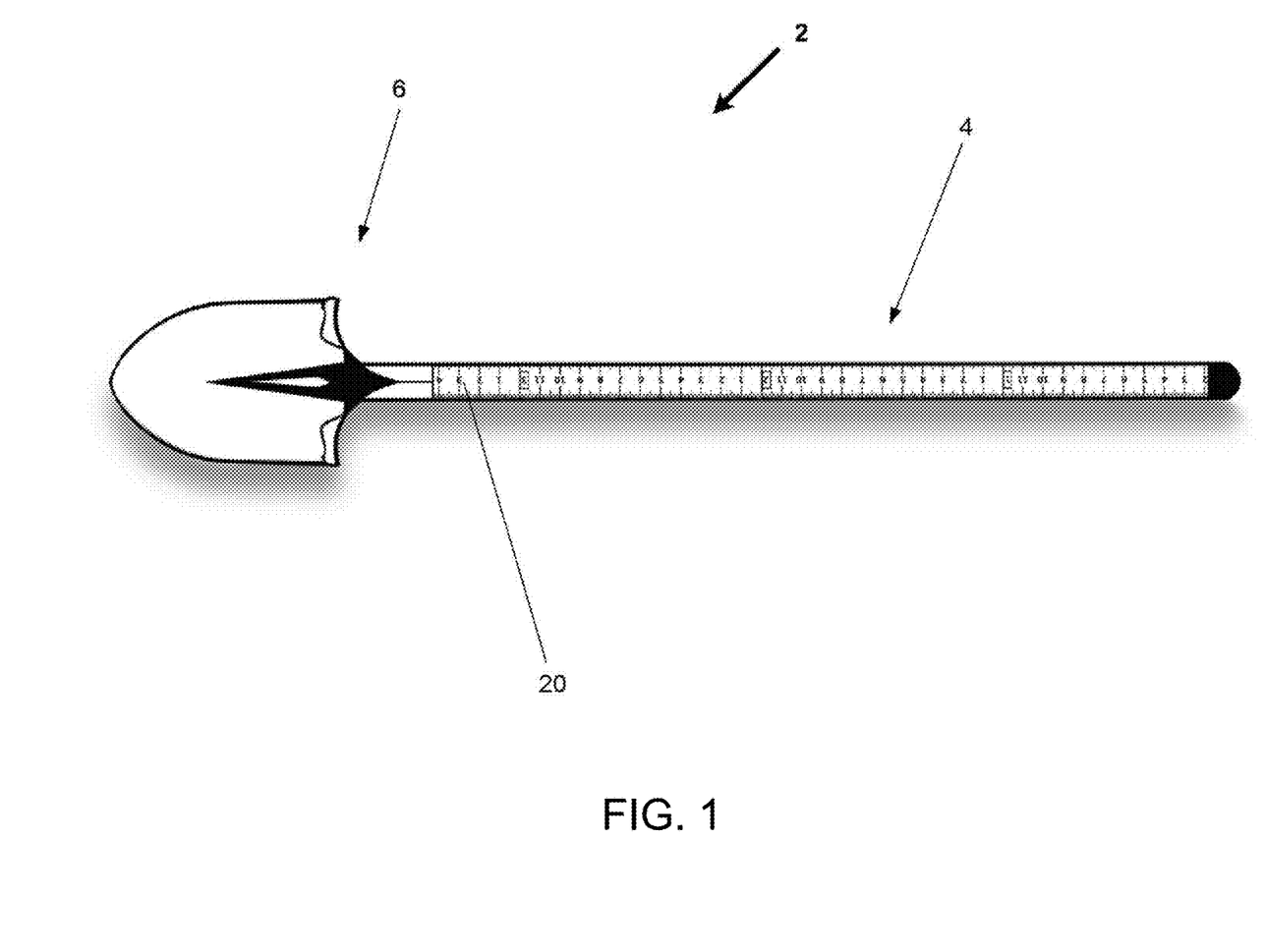
FIG. 1 shows a front view of a shovel in accordance with an embodiment of the present invention.
Figure 2:
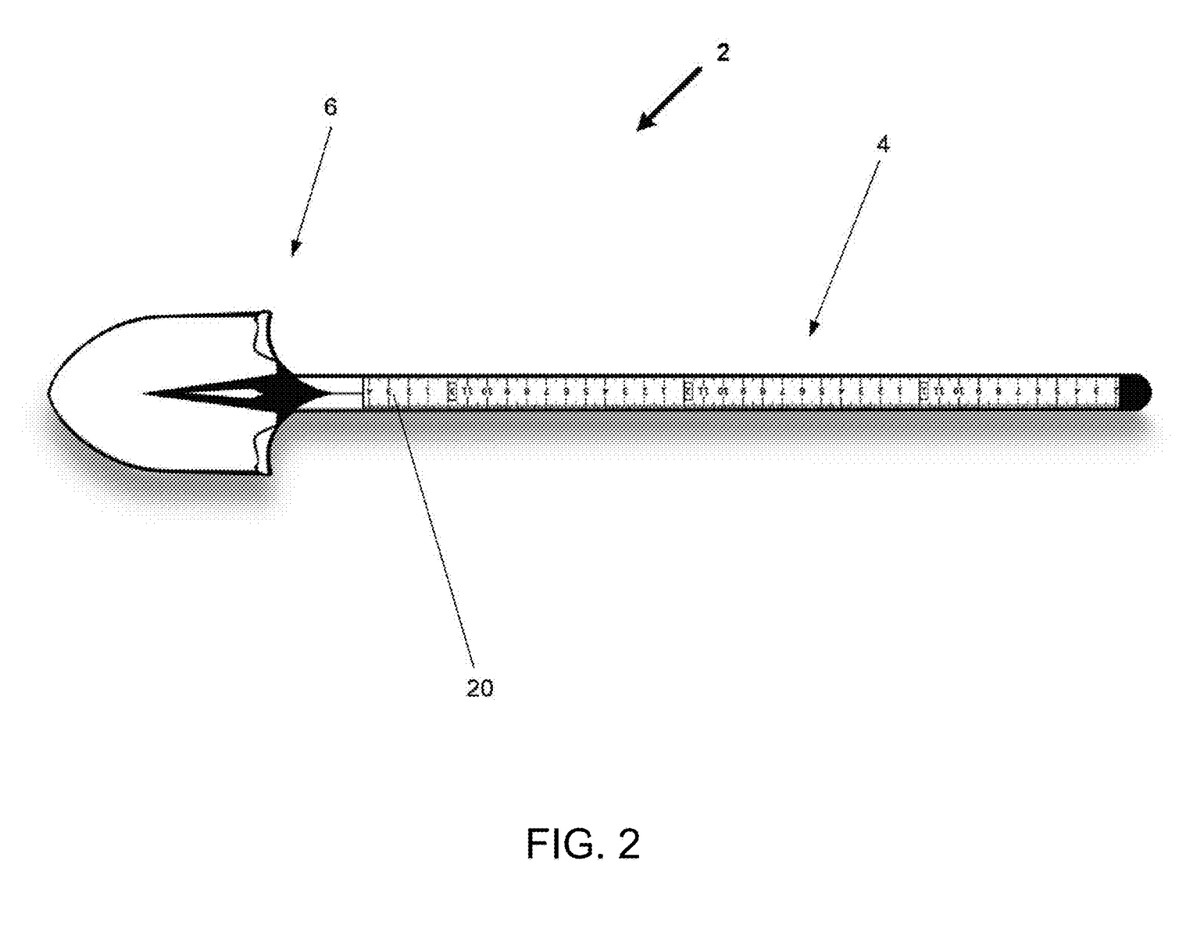
FIG. 2 shows a back view of the shovel of FIG. 1.
Figure 3:
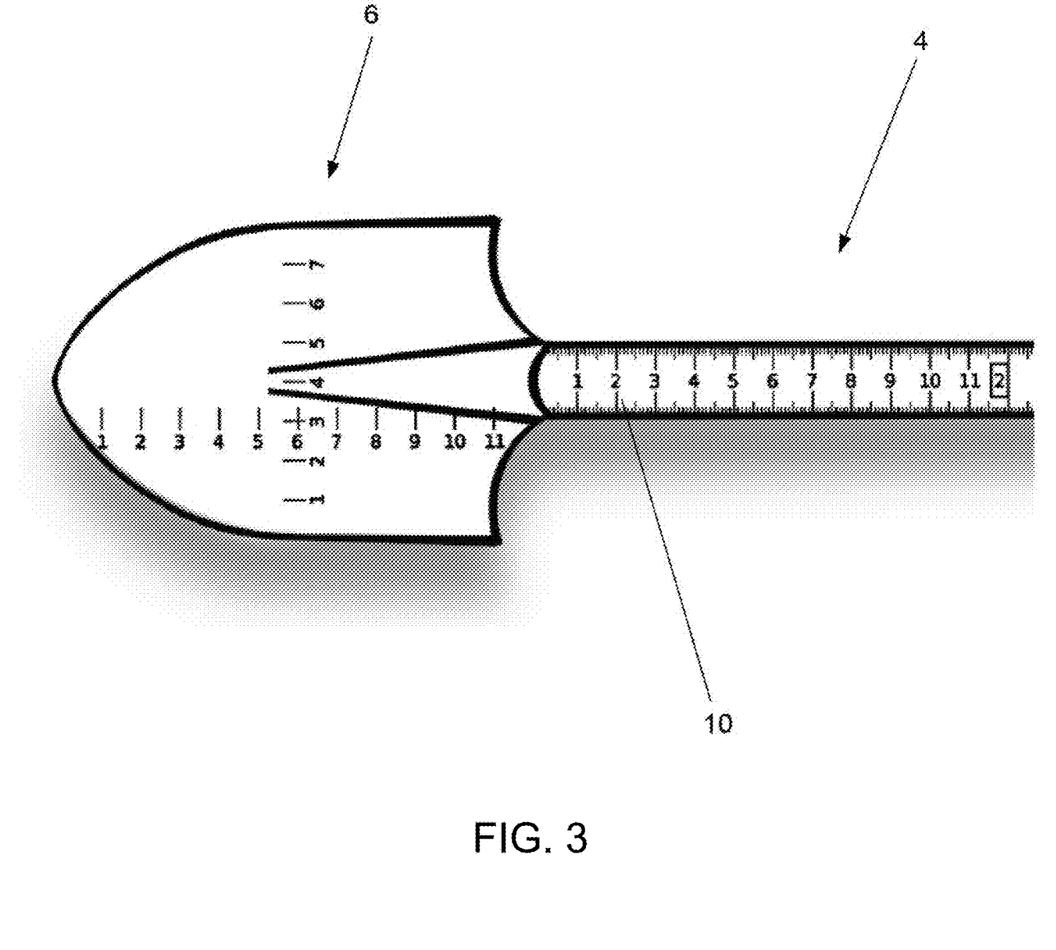
FIG. 3 shows a close-up view of the lower portion of the front of the handle of FIG. 1.
Figure 4:
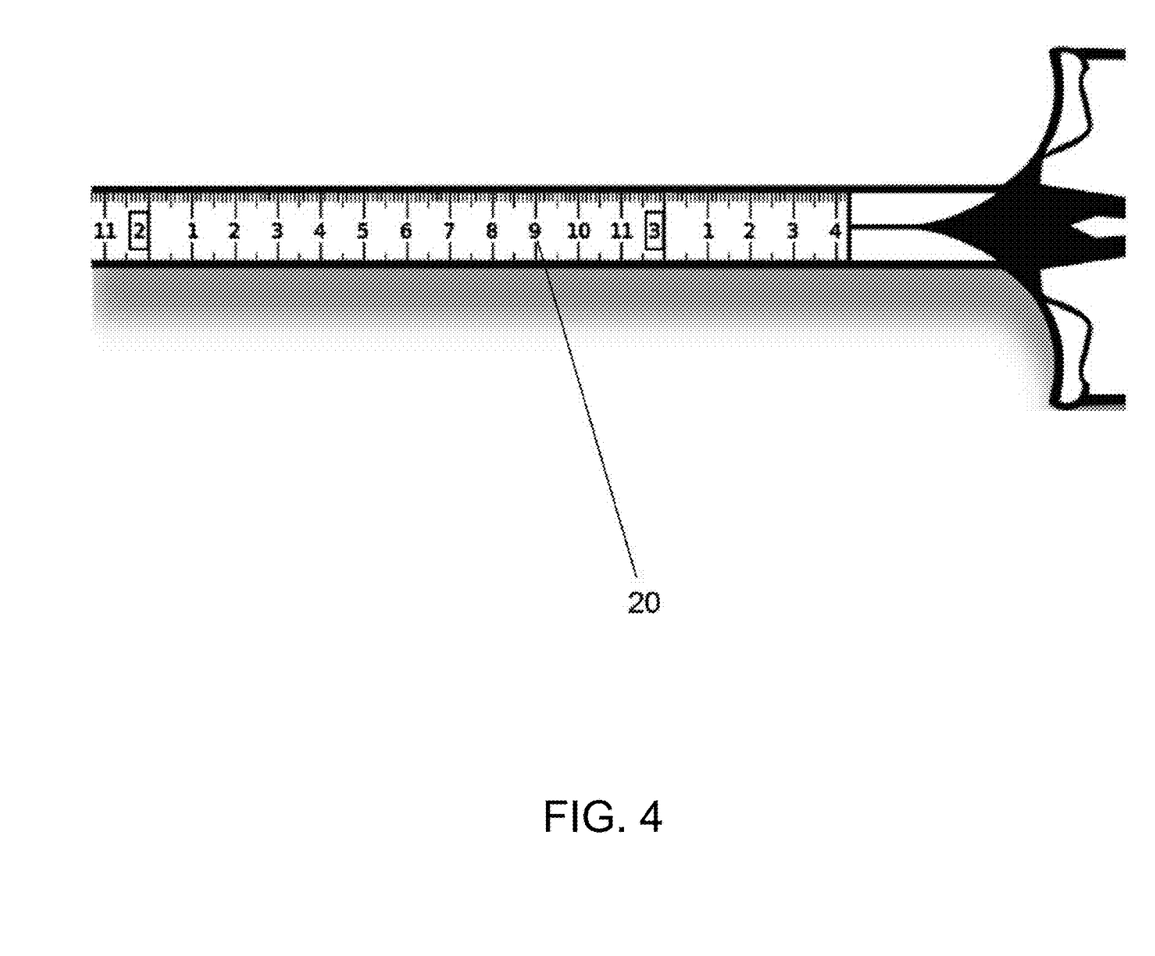
FIG. 4 shows a close-up view of the lower portion of the back of the handle of FIG. 1.
Figure 5:
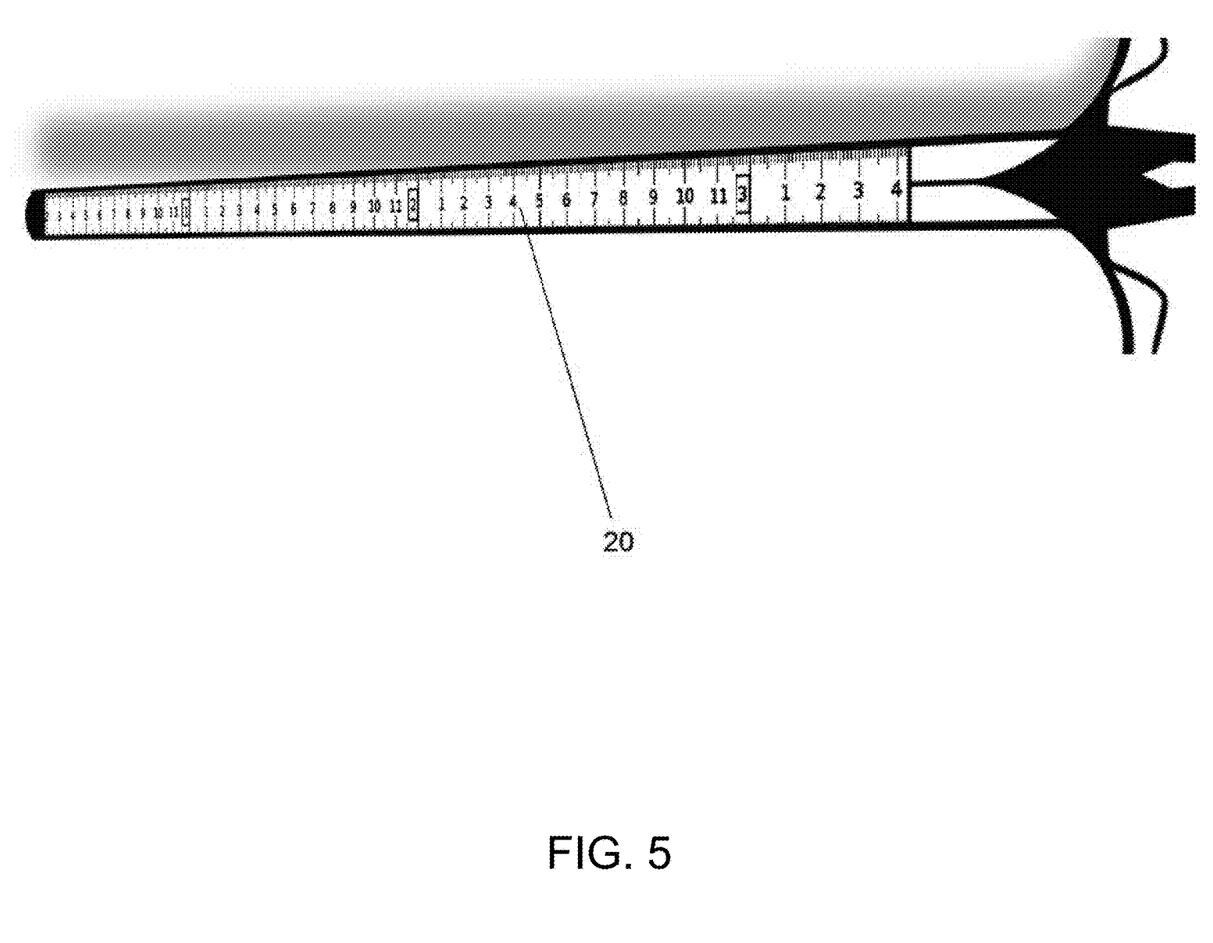
FIG. 5 shows a view of the back of the handle of FIG. 1.
Figure 6:
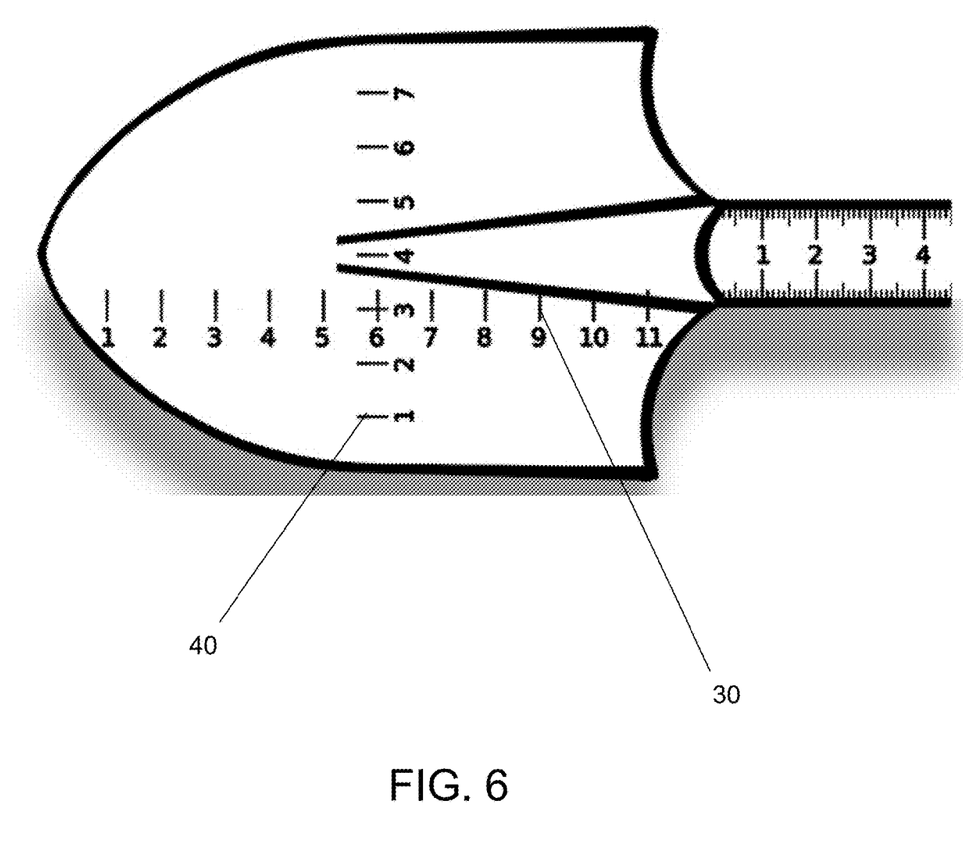
FIGS. 6 and 7 show views of the front of the shovel blade of FIG. 1.
Figure 7:
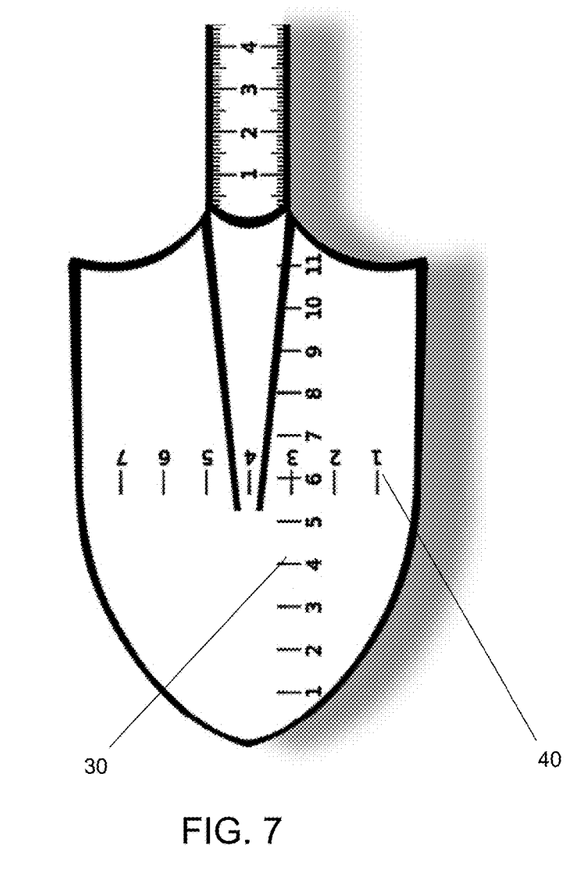
Figure 8:
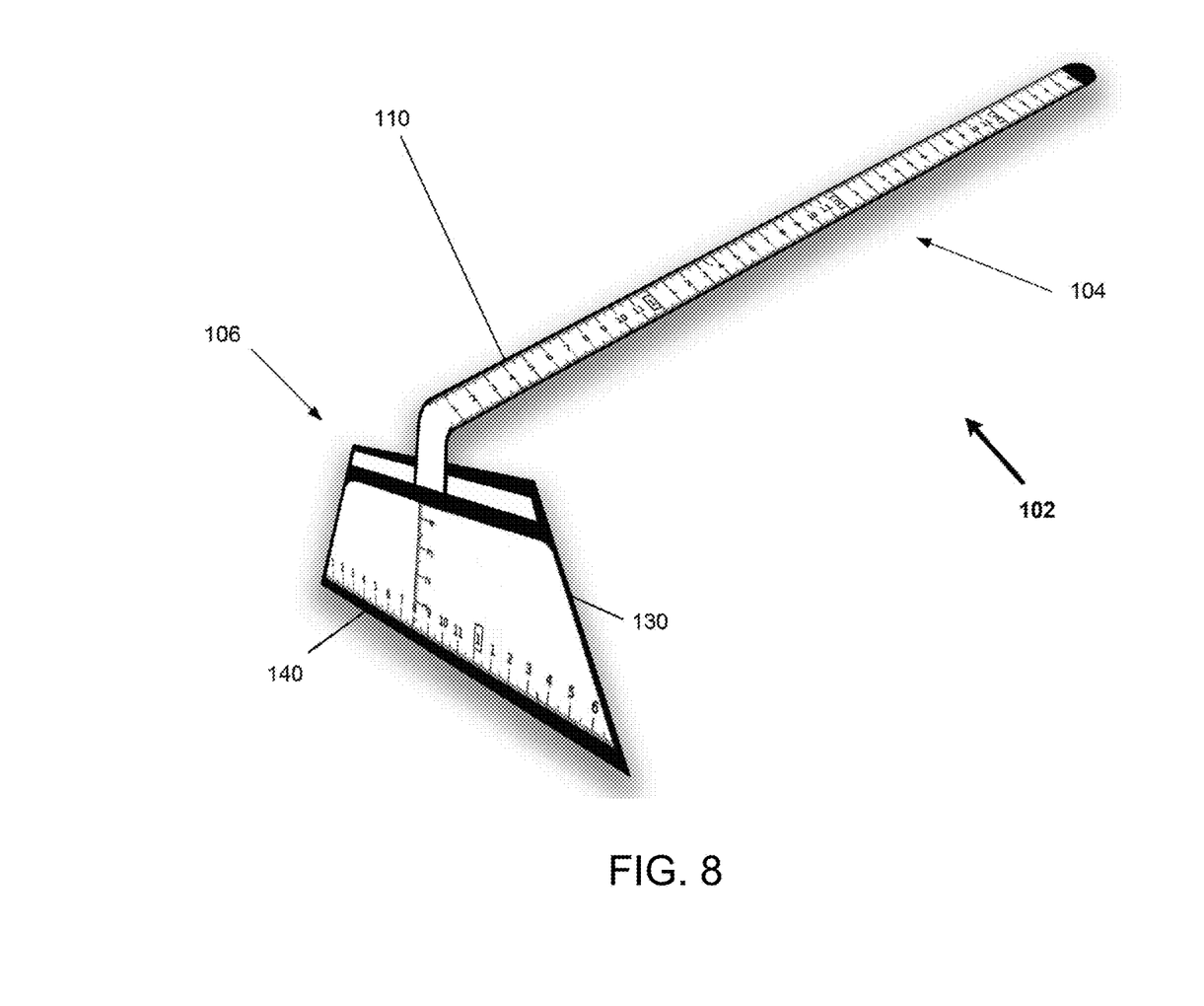
FIG. 8 shows a side perspective view of a hoe in accordance with another embodiment of the present invention.
Figure 9:
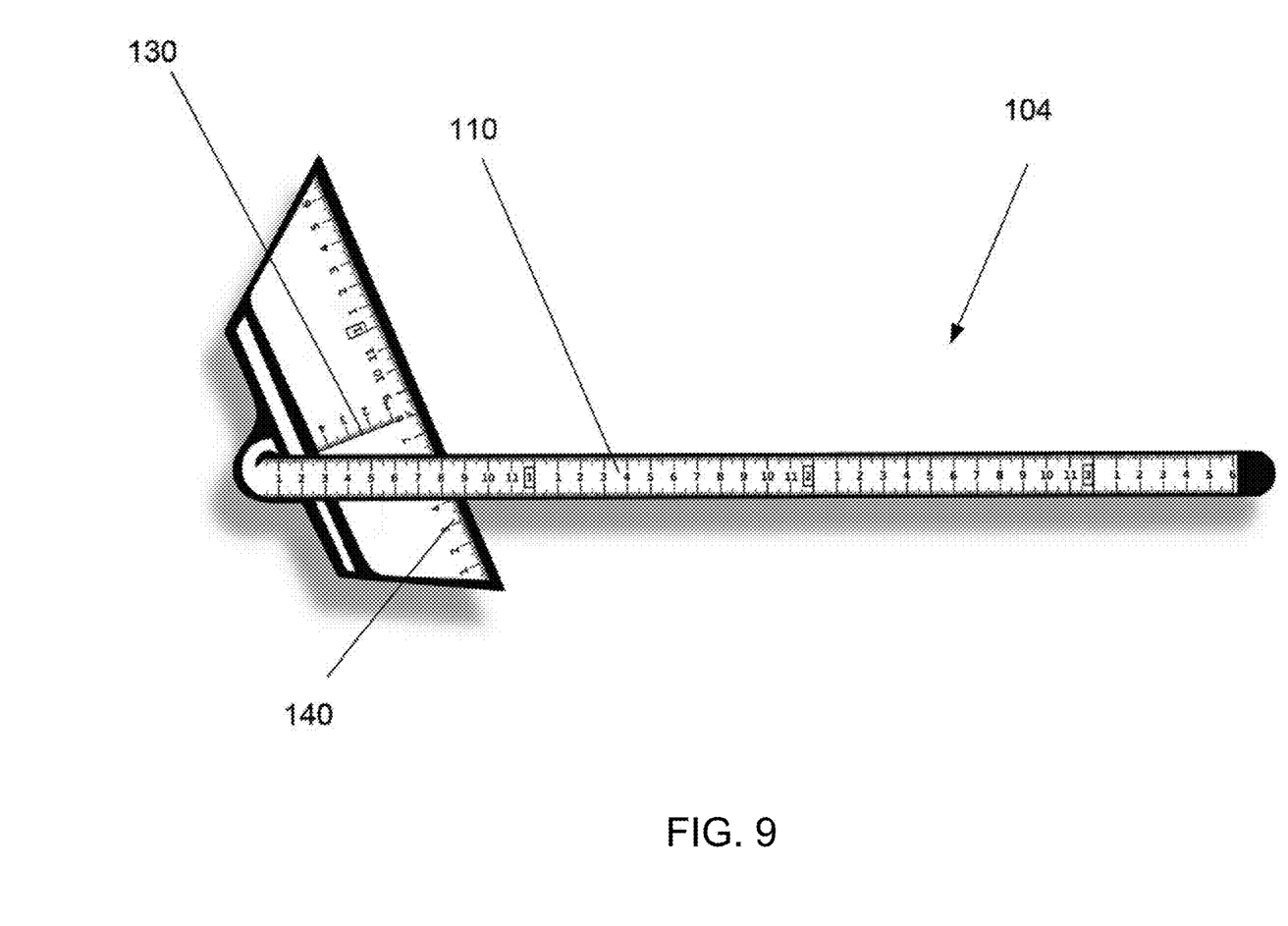
FIG. 9 shows a back perspective view of the hoe of FIG. 8.
Figure 10:
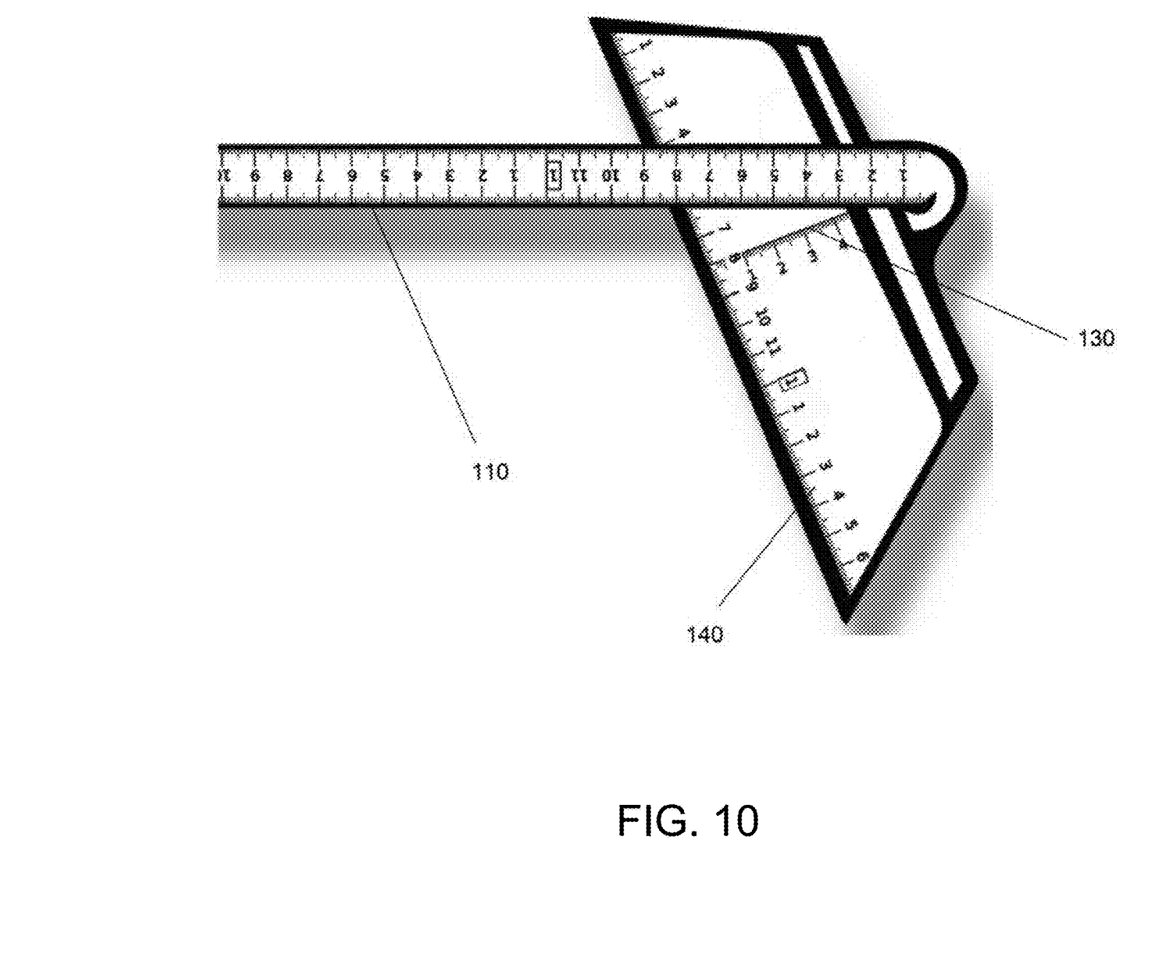
FIG. 10 shows a close-up perspective view of the back of the blade of the hoe of FIG. 1.
Figure 11:
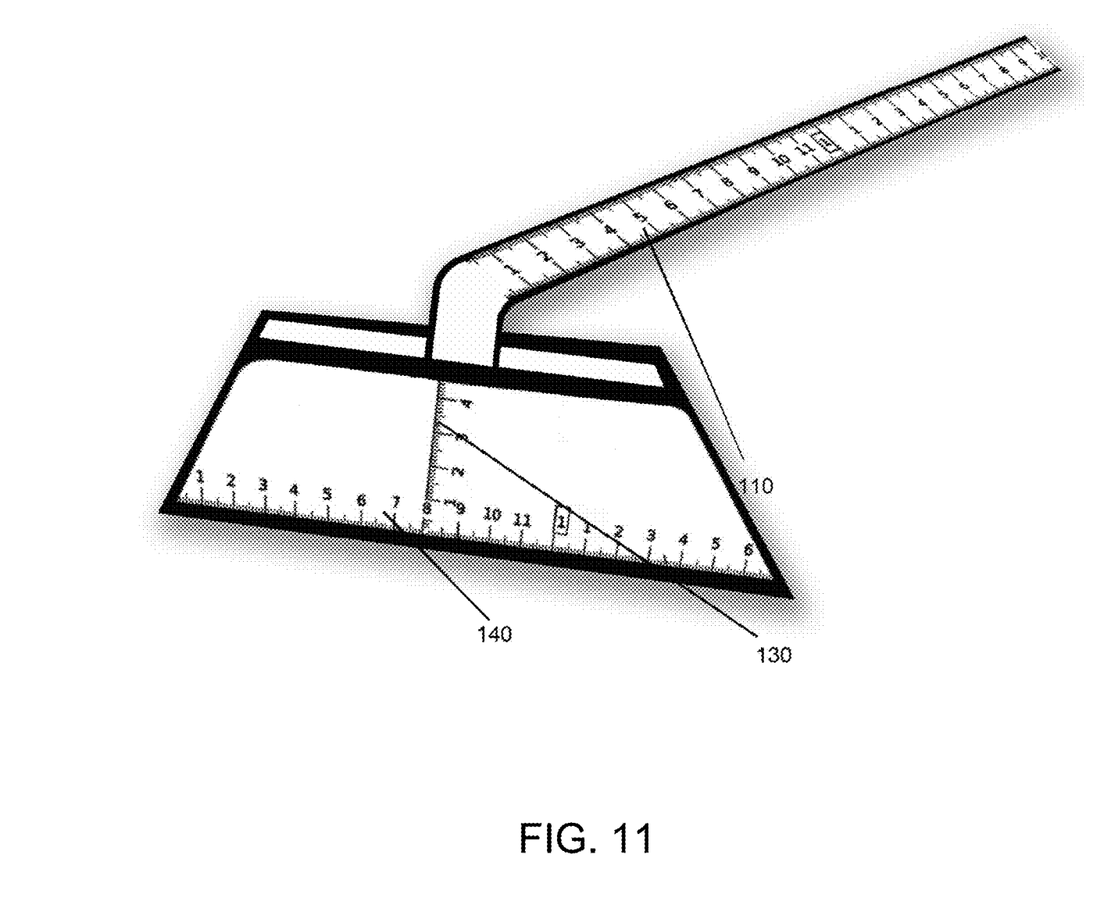
FIG. 11 shows a close-up perspective view of the front of the blade of the hoe of FIG. 1.

As disclosed herein, the term "tool attachment" refers to any tool or implement that is suitable for construction or gardening, including, but not limited to, a shovel (FIGS. 1-7) or a hoe (FIGS. 8-11). The plurality of measurement markings may also be provided on other tools, implements, or gardening attachments, including, but not limited to, shovels, hoes, rakes, trowels, aerators, pitchforks, spades, edgers, weeders, snow shovels, and the like. As used herein, the proximal end of the handle refers to the portion of the handle closest to the gardening attachment while the distal end of the handle refers to the end of handle that is furthest from the gardening attachment. The distal end of the gardening attachment refers to the edge of the attachment which directly comes into contact with the soil or other working surface, while the proximal end of the gardening attachment refers to the portion where the attachment is affixed to the handle. The measurement markings may be US/English standard, metric, some other standard of measurement, or combinations thereof.

As seen in FIGS. 1-11, in several embodiments the invention comprises two lines of measurement markings on the handle (with some extension across the tool attachment, as appropriate): one on the front face 10 and one on the back face 20. One set of markings (e.g., the front) 10 start from the tip of the tool attachment, extend across the face of the attachment and increase towards the distal end of the handle (i.e., "bottom-start"). This permits the user to easily measure the depth of a hole while digging by simply resting the tip of the gardening attachment in the bottom of the hole and viewing the top of the hole against the measurement line. The second set of markings (e.g., the back) 20 start from the distal end of the handle and increase towards the gardening attachment (i.e., "top-start"). This permits the user to easily measure distances on the ground (such as the distance between plantings or holes, width of the top of the hole, and the like) by placing the gardening instrument on the ground with the distal end of the handle as the starting point. The distal end of the gardening attachment also may be placed on the ground and the gardening instrument held vertically to measure the height of various objects from the ground (e.g., fence rail, fence post). In an alternative embodiment, the bottom-start and top-start measurement lines may be reversed as to the face of the handle.

Three, four, or more measurement lines may be provided on the handle (e.g., front, back, right side, left side), and the markings may use different standards. Each measurement line may be independent, or may share a marking that circles or circumscribes the handle. The markings may be printed or painted on the handle, or may be engraved, inscribed, impressed or carved therein, or combinations thereof (with or without printing or coloration). In several embodiments, the markings may be printed on a covering, wrap, or strip (which may be opaque, or transparent in whole or in part) that may be affixed to the handle or other parts of the tool (as described below). The covering, wrap or strip may be comprised of any suitable material, and may be self-adhering with a removable backing cover. Multiple coverings, wraps or strips may be used on the same tool.

As seen in FIGS. 1 and 6-11, in several embodiments the present invention also comprises one or more lines of measurement markings on at least one face of the tool attachment. The markings may be printed, painted, engraved, inscribed, impressed thereon, or combinations thereof (with or without printing or coloration). The measurement lines may be on the front face or back face of the tool attachment, or both. The measurement lines may be located centrally on the face of front/back, along the edges, or combinations thereof.

In one embodiment, one measurement line 30 is a longitudinal line starting from the tip of the gardening attachment and extending up to the top of the attachment where the handle is affixed. This line may be on the front face of the attachment 30, the back face of the attachment 50, or on both faces of the attachment. This line may use the same standard as the measurement line on the front of the handle, and be continuous or contiguous therewith (e.g., for measuring the depth of hole, and the like). A second measurement line 40 extends horizontally from side-to-side across the tool attachment. This second measurement line may be on the front face of the attachment 40, the back face of the attachment 60, or on both faces of the attachment. This allows the user to easily estimate the width of the hole or sections thereof. The second measurement lines may be marked with a zero marking essentially on one edge and increasing across to the other edge, or with the zero marking in the middle and increasing to both edges. The second measurement line may be oriented such that it is substantially perpendicular to the above-described longitudinal line. The second measurement line may be oriented at an angle between five and eighty-five degrees, inclusive, across the longitudinal line on the gardening attachment.

FIGS. 8-11 shows an example of markings on a hoe 102 with a handle 104 and a blade 106. The markings include those in the manner described above, including handle markings 110, a lateral line of markings 140 on the hoe blade, and a vertical line of markings 130 on the hoe blade. Due to curved configuration of the attachment of the hoe blade to the handle, the line of handle markings 110 may originate at the farthest point of the attachment (e.g., at the point of curvature), as opposed to being continuous with the vertical line of markings on the blade.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A tool, comprising:
   a handle with a distal end, a proximal end, a front face, and a back face;
   a tool attachment affixed to the proximal end of the handle, said attachment comprising a front face, a back face, an attachment proximal end, and an attachment distal end;
   a first contiguous line of measurement markings extending longitudinally along the front face of the tool attachment and the front face of the handle, wherein the first line of measurement markings start from the attachment distal end;
   a second line of measurement markings extending longitudinally along the back face of the handle, wherein the second line of measurement markings start from the handle distal end; and
   a third line of measurement markings extending laterally across the front face of the tool attachment at a point between the attachment proximal end and an attachment distal end;
   wherein the third line of measurement markings comprise a zero-point at a midpoint of the front face of the tool attachment, and increase in sequence bidirectionally therefrom.

2. The tool of claim 1, wherein the first line of measurement markings start begins at a distal end of the tool attachment at a point farthest from the distal end of the handle, and runs sequentially and continuously therebetween.

3. The tool of claim 1, wherein the first line and second line of measurement markings comprise US/English standard unit, metric units, or a combination thereof.

4. The tool of claim 1, wherein the first line and second line of measurement markings are printed, painted, engraved, inscribed, or impressed on the respective handle or tool attachment, or combinations thereof.

5. The tool of claim 1, wherein the tool attachment is selected from the group consisting of a shovel blade, hoe blade, rake tines, trowel blade, aerator, pitchfork tines, spade blade, edger blade, and weeder tines.

6. The tool of claim 1, wherein the first line of measurement markings encircle the handle.

7. The tool of claim 1, wherein the tool is a shovel and the tool attachment is a shovel blade.

8. The tool of claim 1, wherein the first line of measurement markings extending along the front face of the handle is printed on a strip or covering affixed to the handle.

9. The tool of claim 8, wherein the strip or covering is self-adhering with a removable backing cover.

10. The tool of claim 1, wherein the second line of measurement markings is printed on a strip or covering affixed to the handle.

* * * * *